US011475059B2

(12) United States Patent
Liu et al.

(10) Patent No.: US 11,475,059 B2
(45) Date of Patent: Oct. 18, 2022

(54) AUTOMATED IMAGE RETRIEVAL WITH GRAPH NEURAL NETWORK

(71) Applicant: THE TORONTO-DOMINION BANK, Toronto (CA)

(72) Inventors: Chundi Liu, Toronto (CA); Guangwei Yu, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 311 days.

(21) Appl. No.: 16/917,422

(22) Filed: Jun. 30, 2020

(65) Prior Publication Data

US 2021/0049202 A1 Feb. 18, 2021

Related U.S. Application Data

(60) Provisional application No. 62/888,435, filed on Aug. 16, 2019.

(51) Int. Cl.
*G06F 16/58* (2019.01)
*G06N 3/08* (2006.01)
*G06N 3/04* (2006.01)

(52) U.S. Cl.
CPC .......... *G06F 16/58* (2019.01); *G06N 3/04* (2013.01); *G06N 3/08* (2013.01)

(58) Field of Classification Search
CPC .......... G06F 16/58; G06N 3/04; G06N 3/08
USPC ....................................................... 707/723
See application file for complete search history.

(56) References Cited

U.S. PATENT DOCUMENTS

| 7,533,197 | B2* | 5/2009 | Leonard | G06F 13/28 |
| | | | | 710/24 |
| 9,342,583 | B2* | 5/2016 | Baluja | G06F 16/313 |
| 10,095,917 | B2* | 10/2018 | Taigman | G06V 40/173 |
| 11,188,786 | B2* | 11/2021 | Wnuk | G06K 9/623 |
| 2006/0015495 | A1* | 1/2006 | Keating | G06F 16/5838 |
| 2015/0125049 | A1* | 5/2015 | Taigman | G06T 3/0006 |
| | | | | 382/118 |

(Continued)

FOREIGN PATENT DOCUMENTS

CN 111324752 A 6/2020

OTHER PUBLICATIONS

Abadi, M. et al., "TensorFlow: Large-Scale Machine Learning on Heterogeneous Distributed Systems," arXiv:1603.04467, Mar. 2016, pp. 1-19.

(Continued)

*Primary Examiner* — Hanh B Thai
(74) *Attorney, Agent, or Firm* — Patent Capital Group (57) ABSTRACT

A content retrieval system uses a graph neural network architecture to determine images relevant to an image designated in a query. The graph neural network learns a new descriptor space that can be used to map images in the repository to image descriptors and the query image to a query descriptor. The image descriptors characterize the images in the repository as vectors in the descriptor space, and the query descriptor characterizes the query image as a vector in the descriptor space. The content retrieval system obtains the query result by identifying a set of relevant images associated with image descriptors having above a similarity threshold with the query descriptor.

16 Claims, 5 Drawing Sheets

(56) References Cited

U.S. PATENT DOCUMENTS

| | | | |
|---|---|---|---|
| 2015/0186501 A1* | 7/2015 | Baluja | G06F 16/313 |
| | | | 707/750 |
| 2016/0042252 A1* | 2/2016 | Sawhney | G06F 16/55 |
| | | | 382/190 |
| 2016/0140425 A1* | 5/2016 | Kulkarni | G06V 10/454 |
| | | | 382/159 |
| 2020/0159766 A1* | 5/2020 | Volkovs | G06K 9/6276 |
| 2022/0152818 A1* | 5/2022 | Kupcsik | B25J 9/1697 |

OTHER PUBLICATIONS

Arandjelović, R. et al., "Three things everyone should know to improve object retrieval," 2012 IEEE Conference on Computer Vision and Pattern Recognition, Jun. 2012, pp. 1-8.

Bai, S. et al., "Regularized Diffusion Process for Visual Retrieval," Proceedings of the Thirty-First AAAI Conference on Artificial Intelligence (AAAI-17), Feb. 2017, pp. 3967-3973.

Chang, C. et al., "Explore-Exploit Graph Traversal for Image Retrieval," Proceedings of the IEEE/CVF Conference on Computer Vision and Pattern Recognition (CVPR), Jun. 2019, pp. 9423-9431.

Chapelle, O. et al., "Cluster Kernels for Semi-Supervised Learning," Neural Information Processing Systems 2003, Dec. 2003, pp. 1-8.

Chapelle, O. et al., "Semi-Supervised Classification by Low Density Separation," AISTATS, Jan. 2005, pp. 57-64.

Chum, O. et al., "Total Recall: Automatic Query Expansion with a Generative Feature Model for Object Retrieval," 2007 IEEE 11th International Conference on Computer Vision, Oct. 2007, pp. 1-8.

Chum, O., "Large-scale discovery of spatially related images," IEEE Transactions on Pattern Analysis and Machine Intelligence, vol. 32, No. 2, Feb. 2010, pp. 371-377.

Donoser, M. et al., "Diffusion Processes for Retrieval Revisited," Proceedings of the IEEE Conference on Computer Vision and Pattern Recognition (CVPR), Jun. 2013, pp. 1320-1327.

Fischer, B. et al., "Clustering with the connectivity kernel," Advances in Neural Information Processing Systems, Dec. 2004, pp. 1-8.

Fischler, M. et al., "Random sample consensus: a paradigm for model fitting with applications to image analysis and automated cartography," Communications of the ACM, vol. 24, No. 6, Jun. 1981, pp. 381-395.

Gordo, A. et al., "Deep Image Retrieval: Learning global representations for image search," arVix: 1604.01325, Jul. 28, 2016, pp. 1-21.

Gordo, A. et al., "End-to-end Learning of Deep Visual Representations for Image Retrieval," arXiv: 1610.07940, May 5, 2017, pp. 1-19.

Heinly, J. et al., "Reconstructing the World* in Six Days *(As Captured by the Yahoo 100 Million Image Dataset)," CVPR 2015 : 28th IEEE Conference on Computer Vision and Pattern Recognition, Jun. 2015, pp. 3287-3295.

Hinton, G.E. et al., "Stochastic Neighbor Embedding," Neural Information Processing Systems 2003, Dec. 2003, pp. 1-8.

Huang, J. et al., "Cross-domain Image Retrieval with a Dual Attribute-aware Ranking Network," Proceedings of the IEEE International Conference on Computer Vision (ICCV), Dec. 2015, pp. 1062-1070.

Iscen, A. et al., "Efficient Diffusion on Region Manifolds: Recovering Small Objects with Compact CNN Representations," Proceedings of the IEEE Conference on Computer Vision and Pattern Recognition (CVPR), Jul. 2017, pp. 2077-2086.

Iscen, A. et al., "Fast Spectral Ranking for Similarity Search," Proceedings of the IEEE Conference on Computer Vision and Pattern Recognition (CVPR), Jun. 2018, pp. 7632-7641.

Iscen, A. et al., "Hybrid Diffusion: Spectral-Temporal Graph Filtering for Manifold Ranking," Asian Conference on Computer Vision, Dec. 2018, pp. 1-16.

Jégou, H. et al., "Improving bag-of-features for large scale image search," International Journal of Computer Vision, 87(3), Mar. 15, 2011, pp. 1-21.

Kalpathy-Cramer, J. et al., "Evaluating performance of biomedical image retrieval systems—an overview of the medical image retrieval task at ImageCLEF 2004-2013," Comput Med Imaging Graph, Jan. 2015, pp. 55-61.

Kingma, D. P. et al., "Adam: A Method for Stochastic Optimization," arXiv:1412.6980, Dec. 22, 2014, pp. 1-9.

Kipf, T. N. et al., "Semi-Supervised Classification with Graph Convolutional Networks," arXiv:1609.02907, Feb. 22, 2017, pp. 1-14.

Liu, Z. et al., "DeepFashion: Powering Robust Clothes Recognition and Retrieval with Rich Annotations," Proceedings of the IEEE Conference on Computer Vision and Pattern Recognition (CVPR), Jun. 2016, pp. 1096-1104.

Lowe, D. G., "Distinctive Image Features from Scale-Invariant Keypoints," International Journal of Computer Vision, 60(2), Nov. 2004, pp. 1-28.

Mishkin, D. et al., "Repeatability Is Not Enough: Learning Affine Regions via Discriminability," European Conference on Computer Vision, Oct. 5, 2018, pp. 287-304.

Noh, H. et al., "Large-Scale Image Retrieval with Attentive Deep Local Features," Proceedings of the IEEE International Conference on Computer Vision (ICCV), Oct. 2017, pp. 3456-3465.

Philbin, J. et al., "Lost in Quantization: Improving Particular Object Retrieval in Large Scale Image Databases," 2008 IEEE Conference on Computer Vision and Pattern Recognition, Jun. 2008, pp. 1-8.

Philbin, J. et al., "Object retrieval with large vocabularies and fast spatial matching," 2007 IEEE Conference on Computer Vision and Pattern Recognition, Jun. 2007, pp. 1-8.

Qin, D. et al., "Hello neighbor: accurate object retrieval with k-reciprocal nearest neighbors," CVPR 2011, Jun. 2011, pp. 777-784.

Radenović, F. et al., "Fine-Tuning CNN Image Retrieval with No Human Annotation," IEEE Transactions on Pattern Analysis and Machine Intelligence, vol. 41, Iss. 7, Jul. 2019, pp. 1655-1668.

Radenović, F. et al., "Revisiting Oxford and Paris: Large-Scale Image Retrieval Benchmarking," Proceedings of the IEEE Conference on Computer Vision and Pattern Recognition (CVPR), Jun. 2018, pp. 5706-5715.

Roweis, S.T. et al., "Nonlinear Dimensionality Reduction by Locally Linear Embedding," Science, vol. 290, Dec. 2000, pp. 2323-2326.

Shi, Z. et al., "Transferring a Semantic Representation for Person Re-Identification and Search," Proceedings of the IEEE Conference on Computer Vision and Pattern Recognition (CVPR), Jun. 2015, pp. 4184-4193.

Siméoni, O. et al., "Local Features and Visual Words Emerge in Activations," Proceedings of the IEEE/CVF Conference on Computer Vision and Pattern Recognition (CVPR), Jun. 2019, pp. 11651-11660.

Sivic, J. et al., "Video Google: a text retrieval approach to object matching in videos," Proceedings Ninth IEEE International Conference on Computer Vision, Oct. 2003, pp. 1-8.

Tang, J. et al., "LINE: Large-scale information network embedding," World Wide Web Conference Committee, May 2015, pp. 1067-1077.

Tenenbaum, J. B. et al., "A Global Geometric Framework for Nonlinear Dimensionality Reduction," Science, vol. 290, Dec. 22, 2000, pp. 2319-2323.

Tolias, G. et al., "Image search with selective match kernels: aggregation across single and multiple images," International Journal of Computer Vision, vol. 116, No. 3, Mar. 2015, pp. 247-261.

Van Der Maaten, L. et al., "Visualizing Data using t-SNE," Journal of Machine Learning Research, vol. 9, Nov. 2008, pp. 2579-2605.

Vaquero, D.A. et al., "Attribute-Based People Search in Surveillance Environments," 2009 Workshop on Applications of Computer Vision (WACV), Dec. 2009, pp. 1-8.

Wang, S. et al., "INSTRE: a New Benchmark for Instance-Level Object Retrieval and Recognition," ACM Trans. Multimedia Comput. Commun. Appl., vol. 11, No. 3, Article 37, Jan. 2015, pp. 1-21.

(56) References Cited

OTHER PUBLICATIONS

Weyand, T. et al., "Discovering favorite views of popular places with iconoid shift," 2011 International Conference on Computer Vision, Nov. 2011, pp.
Xie, J. et al., "Unsupervised Deep Embedding for Clustering Analysis," Proceedings of the $33^{rd}$ International Conference on Machine Learning, Jun. 2016, pp. 1-10.
Xu, J. et al., "Iterative Manifold Embedding Layer Learned by Incomplete Data for Large-scale Image Retrieval," arXiv:1707.09862v2, Apr. 3, 2018, pp. 1-12.
Yang, X. et al., "Locally Constrained Diffusion Process on Locally Densified Distance Spaces with Applications to Shape Retrieval," CVPR Workshops, Jun. 2009, pp. 357-364.
Zhou, D. et al., "Learning with Local and Global Consistency," NIPS, Dec. 2003, pp. 1-8.
Zhou, D. et al., "Ranking on Data Manifolds," NIPS, Dec. 2003, pp. 1-8.
PCT International Search Report and Written Opinion, PCT Application No. PCT/CA2020/050983, dated Oct. 15, 2020, 11 pages.
Potapov, A. et al., "Semantic Image Retrieval by Uniting Deep Neural Networks and Cognitive Architectures," Jun. 14, 2018, pp. 1-10.
Scarselli, F. et al., "The Graph Neural Network Model," IEEE Transactions on Neural Networks, vol. 20, No. 1, Jan. 2009, pp. 61-80.

\* cited by examiner

AUTOMATED IMAGE RETRIEVAL WITH GRAPH NEURAL NETWORK

CROSS REFERENCE TO RELATED APPLICATIONS

This application claims the benefit of U.S. Provisional Application No. 62/888,435, filed Aug. 16, 2019, which is incorporated by reference in its entirety.

BACKGROUND

This disclosure relates generally to retrieving images relevant to a query image, and more particularly to identifying relevant images with a graph neural network architecture.

Identifying related images by computing systems is a challenging problem. From a query image used as an input, content retrieval systems attempt to identify relevant images that are similar or related to the query image. Related images share features with one another, and for example may be different images taken of the same scene, environment, object, etc. Though sharing such similarities, images may vary in many ways, even when taken of the same context. Lighting, viewing angle, background clutter, and other characteristics of image capture may change the way that a given environment appears in an image, increasing the challenge of identifying these related images. For example, four different images of the Eiffel Tower may all vary in angle, lighting, and other characteristics. Using one of these images to identify the other three in a repository of thousands or millions of other images is challenging. As a result, the rate of successfully identifying relevant images (and excluding unrelated images) in existing approaches continues to need improvement. In addition, many approaches may also be computationally intensive and require significant analysis when the query image is received by the image retrieval system, which can prevent these approaches from effectively operating in live executing environments.

SUMMARY

A content retrieval system uses a graph neural network architecture to determine images relevant to an image designated in a query. The graph neural network learns a new descriptor space that can be used to map images in the repository to image descriptors and the query image to a query descriptor. The image descriptors characterize the images in the repository as vectors in the descriptor space, and the query descriptor characterizes the query image as a vector in the descriptor space. The content retrieval system obtains the query result by identifying a set of relevant images associated with image descriptors having above a similarity threshold with the query descriptor. In another instance, the content retrieval system obtains the query result by ranking the set of images according to similarity and selects a subset of relevant images according to the rankings, e.g., selects a subset of subset of relevant images with the highest rankings.

Specifically, the content retrieval system receives a request from a client device to retrieve images relevant to a query image. The content retrieval system accesses an image retrieval graph having a set of nodes representing a set of images and a set of edges representing connections between the set of images. In one embodiment, the image retrieval graph is structured as a graph neural network including one or more layers. The output at a node for a current layer can be generated by applying a set of machine-learned weights for the current layer to the outputs of the node and its neighbor nodes in the previous layer. Thus, the outputs of nodes at a current layer of the graph neural network may represent mappings of the corresponding images to a latent space for the current layer. In one instance, the content retrieval system obtains the outputs of nodes at the last layer of the graph neural network as image descriptors that characterize corresponding images to a descriptor space that is a latent space for the last layer.

The content retrieval system generates a query node representing the query image in the image retrieval graph. The content retrieval system also generates a second set of edges representing connections between the query node and at least a subset of nodes that are identified as neighbor nodes of the query image in the image retrieval graph. The content retrieval system generates a query descriptor mapping the query image to the descriptor space by sequentially applying the set of machine-learned weights to outputs of the neighbor nodes and the query node at the one or more layers of the graph neural network. Subsequently, the content retrieval system identifies images that are relevant to the query image by selecting a subset of nodes that are associated with image descriptors having above a similarity threshold with the query descriptor. In another instance, the content retrieval system obtains the query result by ranking the set of images according to similarity and selects a subset of relevant images according to the rankings, e.g., selects a subset of subset of relevant images with the highest rankings. The subset of relevant images can be provided to the client device as the query result.

By using a graph neural network architecture, the content retrieval system can encode and share neighbor information, including higher-order neighbor information in the image retrieval graph, into the image descriptor for a given node. Moreover, by training an end-to-end graph neural network, the content retrieval system can improve accuracy and training time compared to other types of retrieval methods that involve training processes for determining a set of parameters. Moreover, using a graph neural network may provide more accurate results compared to methods such as query expansion (QE). Thus, in this manner, the content retrieval system can effectively learn a new descriptor space that improves retrieval accuracy while maintaining computational efficiency.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
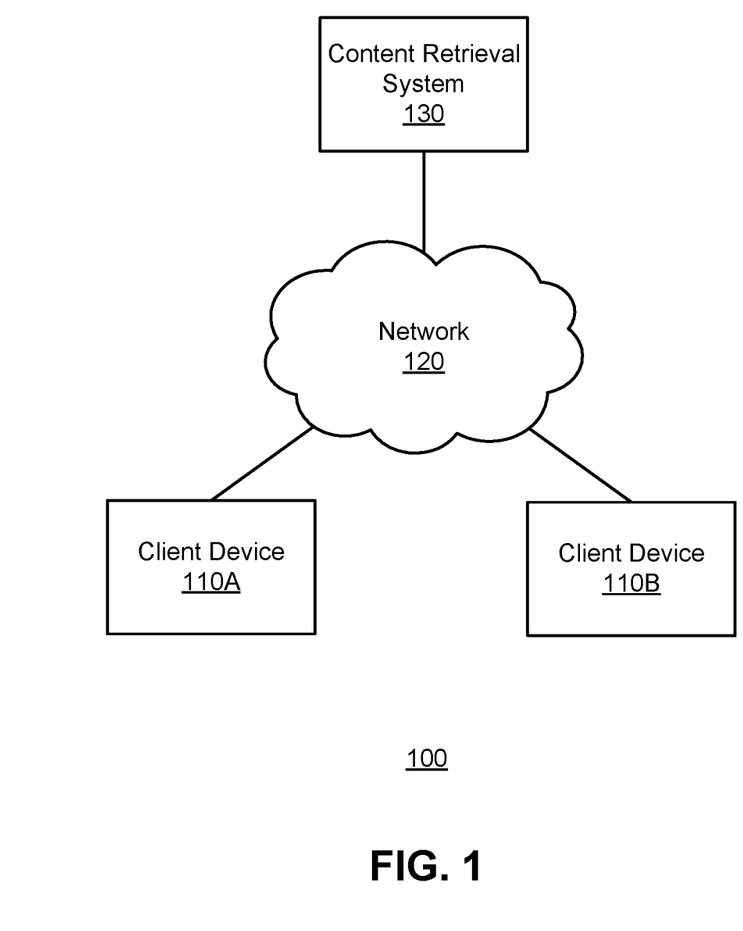
FIG. 1 is a high level block diagram of a system environment for a content retrieval system, in accordance with an embodiment.

FIG. 1 is a high level block diagram of a system environment for a content retrieval system, in accordance with an embodiment. The system environment 100 shown by FIG. 1 includes one or more client devices 110A, 110B, a network 120, and a content retrieval system 130. In alternative configurations, different and/or additional components may be included in the system environment 100.

The content retrieval system 130 identifies relevant content items based on a content item associated with a query. In one embodiment primarily referred throughout the remainder of the specification, the content items are images and the content item associated with the query is a query image. However, it is appreciated that in other embodiments, the content items can be other types of content. For example, the content items may be videos, text (e.g., e-mails, written reports, songs), audio files, and the like. Moreover, the query may be received from a client device 110 or may be entered by a user in at the content retrieval system 130.

In one embodiment, the content retrieval system 130 trains and uses a graph neural network architecture to determine images in a repository relevant to an image designated in a query. The repository may include a number of images (e.g., thousands or millions of images) of various environments and objects that can be considered as candidates for a query. For example, the repository may include images captured by vehicles during travel or may include images captured by individual users that are uploaded to the repository. The content retrieval system 130 may identify a set of relevant images to a query image as images that have the same person, landmark, scene, or otherwise share an object in view of the image. A particular image may be related to more than one other image.

The graph neural network trained by the content retrieval system 130 learns a new descriptor space that can be used to map images in the repository to image descriptors and the query image to a query descriptor. The image descriptors characterize the images in the repository as vectors in the descriptor space, and the query descriptor characterizes the query image as a vector in the descriptor space. The content retrieval system 130 obtains the query result by identifying a set of relevant images associated with image descriptors having above a similarity threshold with the query descriptor. In another instance, the content retrieval system obtains the query result by ranking the set of images according to similarity and selects a subset of relevant images according to the rankings, e.g., selects a subset of subset of relevant images with the highest rankings.

Specifically, during the inference process, the content retrieval system 130 receives a request to retrieve images relevant to a query image. The content retrieval system 130 accesses a trained image retrieval graph having a set of nodes representing a set of images and a set of edges representing connections between the set of images. In one embodiment, the image retrieval graph is structured as a graph neural network including one or more layers. In such an instance, the output at a node for a current layer can be generated by applying a set of machine-learned weights to the current layer to the outputs of the node and its neighbor nodes in the previous layer. Thus, the outputs of nodes at a current layer of the graph neural network may represent mappings of the corresponding images to a latent space for the current layer. In one instance, the outputs of nodes at the last layer of the graph neural network are identified as the image descriptors that characterize corresponding images to a descriptor space.

As defined herein, "neighbor nodes" for a node may indicate any subset of nodes that are connected to the node in the graph through one or more edges. The neighbor nodes of the node may further be specified according to how many connections they are away from the node. For example, the "first-order" neighbor nodes may be those directly connected to the node, the "second-order" neighbor nodes may be those directly connected to the first-order nodes, the "third-order" neighbor nodes may be those directly connected to the second-order nodes. and so on.

In one embodiment, the images are initially mapped to base descriptors that characterize the images as vectors in a latent space. The first layer of the graph neural network may be configured to receive base descriptors as input. The base descriptors for images in the repository and the query image may be generated by applying a machine-learned model, such as an artificial neural network model (ANN), a convolutional neural network model (CNN), or other models that are configured to map an image to a base descriptor in the latent space such that images with similar content are closer to each other in the latent space. In another instance, the input at the first layer of the graph neural network is configured to receive base descriptors as pixel data of the images.

Thus, given a trained graph neural network with the set of nodes and the set of edges, the content retrieval system 130 may obtain the image descriptor for a node by performing a forward pass step for the node. During the forward pass step for the node, the base descriptor for the node is input to the first layer of the graph neural network and the output for the node is sequentially generated through the one or more layers of the graph neural network by applying the set of weights at each layer to the output of the first-order neighbor nodes and the node in the previous layer. The output for the node at the last layer may be obtained as the image descriptor for the node. Thus, information from higher order neighbors are propagated to the node as the set of nodes are sequentially updated through the one or more layers of the graph neural network.

Figure 2:
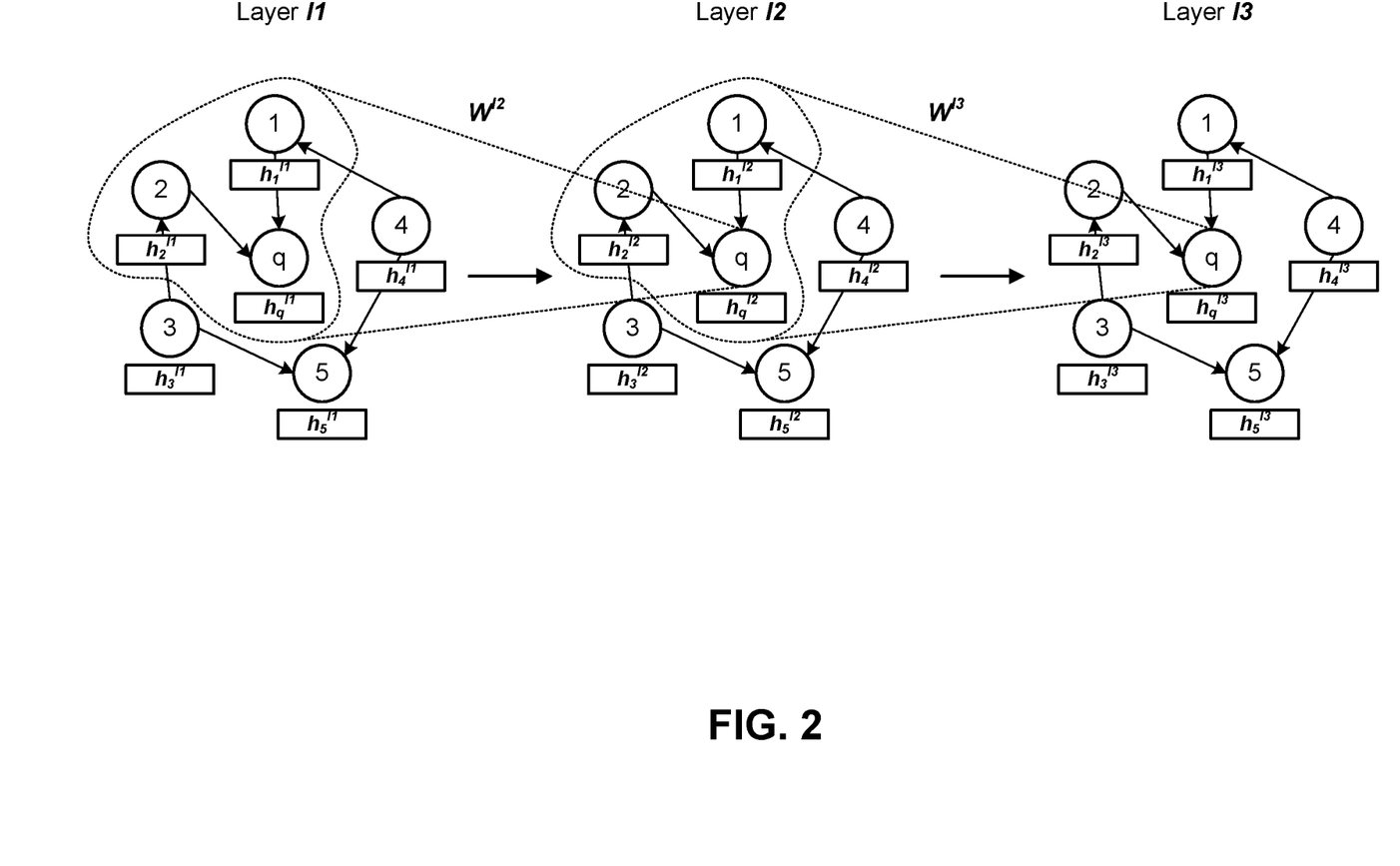
FIG. 2 illustrates an example inference process for identifying relevant images to a query image using a graph neural network architecture, in accordance with an embodiment.

FIG. 2 illustrates an example inference process for identifying relevant images to a query image using a graph neural network architecture 200, in accordance with an embodiment. The graph neural network 200 shown in FIG. 2 includes a set of nodes $\{1, 2, 3, 4, 5\}$ representing a set of images in a repository and set of edges representing connections between the set of images. The graph neural network 200 includes three layers l1, l2, and l3. Moreover, layer l2 is associated with a set of weights $W^{l2}$ and layer l3 is associated with a set of weights $W^{l3}$. Before receiving the query request, the content retrieval system 130 may obtain image descriptors for the set of nodes $\{1, 2, 3, 4, 5\}$ by performing a forward pass step for the nodes. For example, taking node 5 as an example, the base descriptor $x_5 = h_5^{l1}$ for node 5 is input to layer l1 of the graph neural network 200. The output $h_5^{l2}$ of node 5 at layer l2 is generated by applying the set of weights $W^{l2}$ to the output of neighbor nodes $\{3, 4\}$ and node 5 in the previous layer l1. This process is repeated for other nodes. Subsequently, the output $h_5^{l3}$ of node 5 at layer l3 is generated by applying the set of weights $W^{l3}$ to the output of neighbor nodes $\{3, 4\}$ and node 5 in the previous layer l2, and is obtained as the image descriptor for node 5. This process is also repeated for other nodes in the graph neural network.

Returning to FIG. 1, subsequently, the content retrieval system 130 generates a query node representing the query image in the image retrieval graph. The content retrieval system 130 also generates a second set of edges representing connections between the query node and at least a subset of nodes that are identified as neighbor nodes of the query image in the image retrieval graph. In one embodiment, the subset of nodes that are connected to the query node through the second set of edges are identified by generating the base descriptor for the query node and identifying nodes that have base descriptors having above a similarity threshold with the base descriptor for the query node.

As shown in the example of FIG. 2, the content retrieval system 130 generates a query node q is generated in the graph neural network. The content retrieval system 130 determines a subset of nodes {1, 2} as first-order neighbor nodes of the query node q and generates a second set of edges representing connections between the query node q and the subset of nodes {1, 2}.

The content retrieval system 130 generates a query descriptor mapping the query image to the descriptor space. In one embodiment, the query descriptor is generated by performing a forward pass for a set of participant nodes including the query node in the graph neural network. The participant nodes are selected nodes in the graph neural network that will participate in generating the query descriptor, and thus, information from the participant nodes may propagate to the query descriptor during the inference process. In one embodiment, the set of participant nodes can be the entire set of nodes. In another embodiment, the set of participant nodes can include higher-order neighbors of the query node, such as first and second-order neighbor nodes of the query node. Since performing a forward pass for the entire set of nodes in the repository can be computationally exhaustive, the content retrieval system 130 can more efficiently generate the query descriptor if only a subset of nodes proximate to the query node are used.

As shown in the example of FIG. 2, among performing forward pass steps for other nodes, the base descriptor $x_q = h_q^{l1}$ for node q is input to layer l1 of the graph neural network 200. The output $h_q^{l2}$ of node q at layer l2 is generated by applying the set of weights $W^{l1}$ to the output of neighbor nodes {1, 2} and node q in the previous layer l1. The process is repeated for other nodes in the set of participant nodes. For example, this may correspond to the subset of first-order neighbor nodes {1, 2} and the second-order neighbor nodes that are connected to the subset of nodes {1, 2}, after the query node q has been incorporated into the graph neural network. Subsequently, the output $h_q^{l3}$ of node q at layer l3 is generated by applying the set of weights $W^{l2}$ to the output of neighbor nodes {1, 2} and node q in the previous layer l2, and is obtained as the query descriptor. The process is also repeated for other nodes in the set of participant nodes.

After the query descriptor is generated, the content retrieval system 130 identifies images that are relevant to the query image by selecting a subset of nodes that are associated with image descriptors having above a threshold similarity with the query descriptor. In another instance, the content retrieval system 130 obtains the query result by ranking the set of images according to similarity and selects a subset of relevant images according to the rankings, e.g., selects a subset of subset of relevant images with the highest rankings. The subset of relevant images can be provided to the client device as the query result. The query result can then be used by the user to perform various types of tasks.

By using a graph neural network architecture, the content retrieval system 130 can encode and share neighbor information, including higher-order neighbor information in the image retrieval graph, into the image descriptor for a given node. Moreover, by training an end-to-end graph neural network, the content retrieval system 130 can improve accuracy and training time compared to other types of retrieval methods that involve training processes for determining a set of parameters. Moreover, using a graph neural network may provide more accurate results compared to methods such as query expansion (QE). Thus, in this manner, the content retrieval system 130 can effectively learn a new descriptor space that improves retrieval accuracy while maintaining computational efficiency.

In one embodiment, the content retrieval system 130 trains the weights of the graph neural network by initially setting estimates for the weights, and iteratively updating the estimated weights based on a loss function. Specifically, the content retrieval system 130 generates the structure of the graph neural network having the set of nodes and edges for images in the repository and initializes the output for the nodes. The content retrieval system 130 trains the graph neural network by repeatedly iterating between a forward pass step and an update step. During the forward pass step, the content retrieval system generates estimated image descriptors for the nodes by performing forward pass for nodes in the network. The content retrieval system 130 determines a loss function based on the estimated image descriptors. In one embodiment, the loss for a node is a function that increases when similarity scores between the node and neighbor nodes are above a predetermined threshold. In one instance, a similarity score is given by the dot product between the estimated image descriptor for the node and the estimated image descriptor for a corresponding first-order neighbor node. The loss function may be determined as the sum of losses across the set of nodes of the graph neural network. During the update step, the content retrieval system 130 repeatedly updates the weights for the graph neural network by backpropagating terms obtained from the loss function to update the set of weights. This process is repeated until the loss function satisfies a predetermined criteria.

The client device 110 is a computing device such as a smartphone with an operating system such as ANDROID® or APPLE® IOS®, a tablet computer, a laptop computer, a desktop computer, or any other type of network-enabled device. A typical client device 110 includes the hardware and software needed to connect to the network 122 (e.g., via WiFi and/or 4G or other wireless telecommunication standards). The client device 110 allows a user of the content retrieval system 130 to request a set of images relevant to an image designated in a query. For example, the user may submit the query image by uploading an image locally stored on the client device 110 to a software agent deployed by the content retrieval system 130 or through an online application, such as a browser application connected to the content retrieval system 130 through the network 120. As another example, the user may submit a hyperlink to the query image. It is appreciated that in other embodiments, the client device 110 can have different configurations that allow a user to submit a query to the content retrieval system 130.

The network 120 provides a communication infrastructure between the worker devices 110 and the process mining system 130. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

Content Retrieval System

Figure 3:
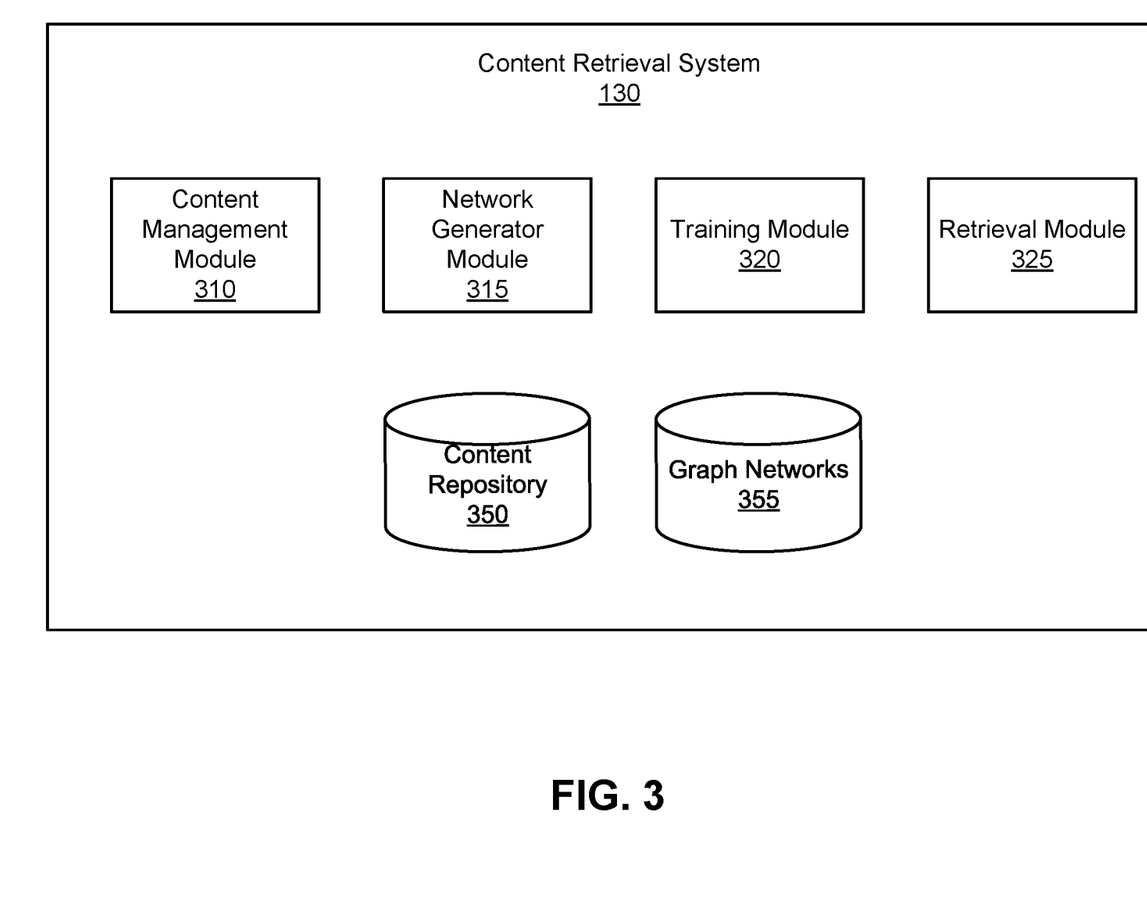
FIG. 3 is a block diagram of an architecture of a content retrieval system, in accordance with an embodiment.

FIG. 3 is a block diagram of an architecture of the content retrieval system 130, in accordance with an embodiment. The content retrieval system 130 shown by FIG. 3 includes a content management module 310, a network generator module 315, a training module 320, and a retrieval module 325. The content retrieval system 130 also includes a content repository 350 and a graph networks 355 database. In alternative configurations, different and/or additional components may be included in the content retrieval system 130.

The content management module 310 manages one or more repositories of content that can be considered as candidates for a query. As discussed in conjunction with FIG. 1, the content can be in the form of images. The images in the content repository 350 are typically represented in various color spaces, such as red-blue-green (RGB) or hue-saturation-value (HSV) color spaces. The images in the content repository 350 may significantly vary in appearance from one another, even for images which are related. The images thus may vary significantly with respect to brightness, color, field-of-view, angle-of-view, additional objects or environments captured in the image, and the like. However, it is appreciated that the content management module 310 can manage other types of content depending on the content type of the query.

In one embodiment, the content management module 310 may categorize images into one or more categories depending on subject matter, and the like. For example, the categories may include images of vehicles, landmarks, different objects, and the like. In this manner, the content retrieval system 130 can effectively allocate computational resources to the set of images that are known to the set of images that at least are directed to the relevant subject matter of the query request.

The network generator module 315 constructs the graph neural network with a set of nodes representing the set of images and the set of edges for one or more layers. Thus, a node in the graph neural network may be connected to a set of neighbor nodes through edges. In one embodiment, the network generator module 315 determines the neighbor nodes for a given node based on an adjacency score that indicates similarity between the base descriptors for a pair of images. In one instance, the adjacency score between node i and node j may be given by:

$$a_{ij} = x_i^T x_j \quad (1)$$

where $x_i$ is the base descriptor for node i and $x_j$ is the base descriptor for node j. For a given node, the network generator module 315 may compute adjacency scores between the node and other nodes of the graph neural network and select nodes that have above a threshold adjacency score with the node as neighbor nodes.

Thus, after the network generator module 315 has generated the set of edges, the graph neural network can be expressed as a symmetric adjacency matrix A, in which the rows of the matrix correspond to the set of nodes, and the columns of the matrix correspond to the set of nodes. An element $a_{ij}$ corresponding to an edge between node i and node j in the adjacency matrix A may be given by:

$$a_{ij} = x_i^T x_j \text{ if } x_j \in \mathcal{N}_k(x_i) \lor x_i \in \mathcal{N}_k(x_j), 0 \text{ otherwise.} \quad (2)$$

where $\mathcal{N}_k(x_i)$ is the set of k first-order neighbor nodes that are connected to image for node i, $x_i$ is the base descriptor for node i, and $x_j$ is the base descriptor for node j.

The network generator module 315 may also determine a dimensionality for the latent space of each layer of the graph neural network. The dimensionality for a layer may correspond to the number of elements in the output of nodes for that layer. For example, the dimensionality for the first input layer of the graph neural network may correspond to the number of elements in the base descriptors for the set of nodes, and the dimensionality for the last layer of the graph neural network may correspond to the number of elements in the image descriptors for the set of nodes. Moreover, a current layer l of the graph neural network may be associated with an initialized set of weights $W^l$, in which the number of rows correspond to the dimensionality of the current layer l, and the number of columns correspond to the dimensionality of the previous layer l-1, or vice versa.

In one embodiment, the graph neural network generated by the network generator module 315 is configured such that the output $h_i^l$ at node i for a current layer l=1, 2, ..., L is generated by further applying the adjacency scores for the node in addition to applying the set of weights for the current layer to the outputs of the node and its neighbor nodes in the previous layer. In one instance, the weights are applied to the first-order neighbor nodes of the node. Thus, the output $h_i^l$ at node i for the current layer l may be given by:

$$h_i^l = \sigma\left(W^l \sum_{j \in N_k(x_i)} a_{ij} h_j^{(l-1)} + b^l\right) \quad (3)$$

where $h_j^{(l-1)}$ is the output at node j for the previous layer l-1, $W^l$ and $b^l$ are the set of weights for the current layer l, and σ is a non-linear or linear activation function. Thus, the output at the current layer l may be configured by applying the set of weights for the layer to a weighted combination of the output of the neighbor nodes according to the adjacency scores of the neighbor nodes.

In one embodiment, a normalized adjacency matrix may be used in the equation (3), given by:

$$\tilde{a}_{ij} = \left(\sum_{m=1}^n a_{im}\right)^{-\frac{1}{2}} \left(\sum_{m=1}^n a_{jm}\right)^{-\frac{1}{2}} a_{ij}. \quad (4)$$

Since A is symmetric, normalization ensures that both rows and columns have unit norm and reduces bias towards "popular" images that are connected to many nodes in the graph, and improves optimization stability. The network generator module 315 may generate such graph neural networks for different categories of image repositories and store them in the graph networks datastore 355.

The training module 320 trains the weights of the graph neural network by iteratively updating the estimated weights based on a loss function. During the forward pass step, the training module 320 generates estimated image descriptors for the nodes by performing a forward pass step to generate estimated outputs for nodes throughout the one or more layers of the graph neural network. For example, equation (3) may be used to sequentially generate estimated outputs using an estimated set of weights for the iteration. In one embodiment, the estimated image descriptors for node i are given by:

$$\tilde{x}_i = \frac{h_i^L}{\|h_i^L\|_2} \quad (5)$$

where the denominator is a normalizing factor for $h_j^L$ and L denotes the last layer of the graph neural network. However, it is appreciated that any other normalizing factor can be used.

The training module 320 determines a loss function based on the estimated image descriptors that increases when similarity scores between the node and neighbor nodes are above a predetermined threshold. In one instance, the similarity score between node i and node j may be given by:

$$s_{ij} = \tilde{x}_i^T \tilde{x}_j \quad (6)$$

where $\tilde{x}_i$ is the estimated image descriptor for node i and $x_j$ is the estimated image descriptor for node j. In one instance, the loss $\mathcal{L}(s_{ij})$ for a node i is given by a "guided similarity separation" loss:

$$\mathcal{L}(s_{ij}) = -\frac{\alpha}{2}(s_{ij} - \beta), \, j \in \mathcal{N}_k(i) \quad (7)$$

where $\alpha > 0$ controls the shape of the loss, and $\beta$ is a "similarity threshold" with a value in the range of (0, 1). The loss function may be determined as the sum of losses across the set of nodes of the graph neural network.

During the update step, the training module 320 repeatedly updates the values for the set of weights $W^l$, l= 1, 2, . . . . L by backpropagating terms obtained from the loss function to reduce the loss function. In one instance, the terms obtained from the loss function is the derivative of the loss for the set of nodes:

$$\frac{\partial \mathcal{L}(s_{ij})}{\partial s_{ij}} = -\alpha(s_{ij} - \beta) \quad (8)$$

and $\alpha$ and $\beta$ are the parameters described in equation (7). As shown in equation (8), the guided similarity separation loss allows the similarity score $s_{ij}$ to increase if it is above a given threshold $\beta$ and decrease if otherwise. Effectively, the guided similarity separation loss has a clustering effect where images with higher similarity scores move closer together, and images with lower similarity scores get pushed further apart. This process is repeated until the loss function satisfies a predetermined criteria.

Figure 4:
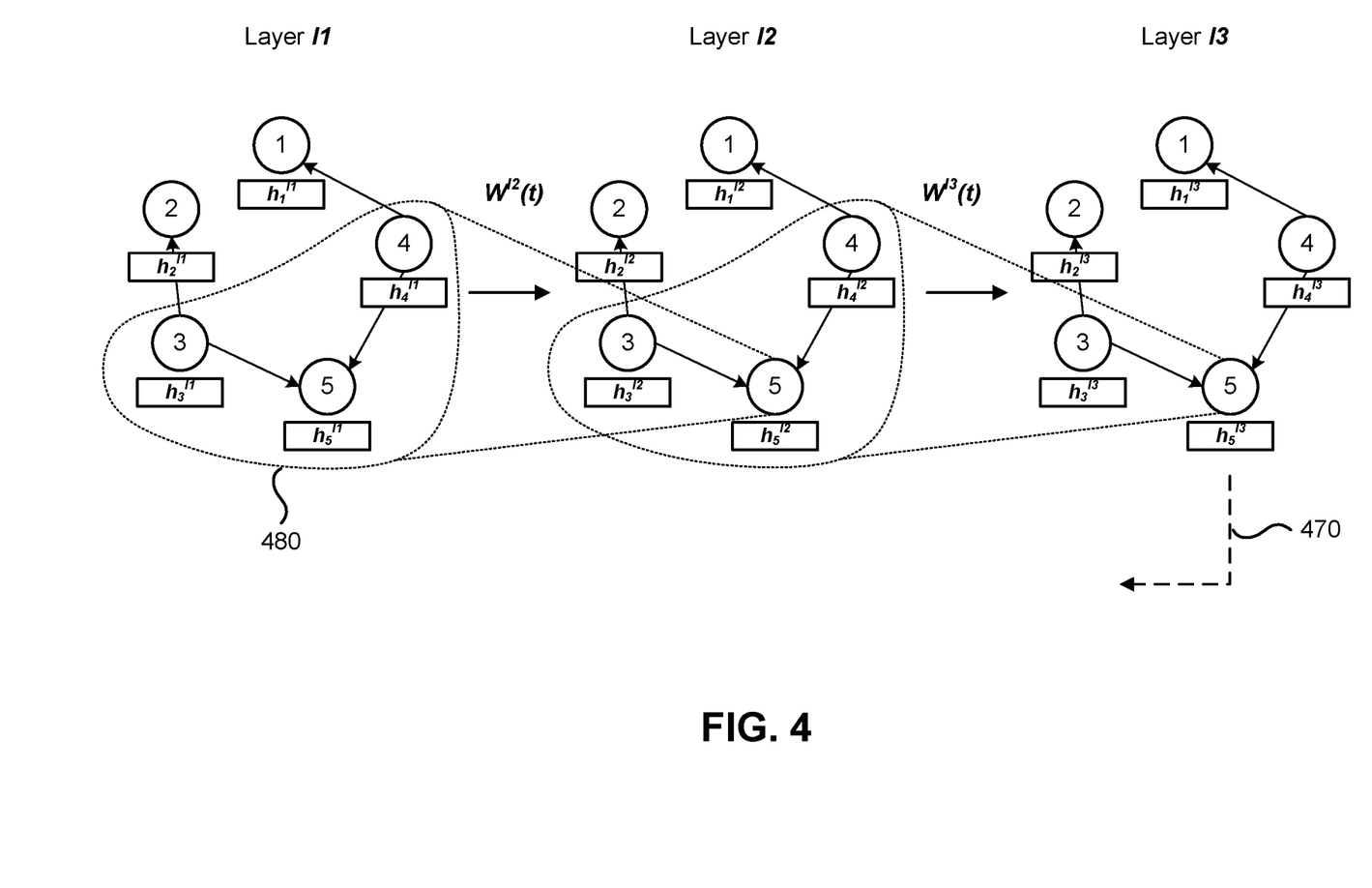
FIG. 4 illustrates an example training process for the graph neural network architecture, in accordance with an embodiment.

FIG. 4 illustrates an example training process for the graph neural network architecture 200, in accordance with an embodiment. As shown in FIG. 4, among performing forward pass steps for other nodes for a training iteration t, the base descriptor $x_5 = h_5^{l1}$ for node 5 is input to layer l1 of the graph neural network 200. The estimated output $h_5^{l2}(t)$ of node 5 at layer l2 is generated by applying an estimated set of weights $W^{l2}(t)$ to the output of a set 480 of neighbor nodes {3, 4} and node 5 in the previous layer l1. This process is repeated to generate estimated outputs for other nodes. Subsequently, the estimated output $h_5^{l3}(t)$ of node 5 at layer l3 is generated by applying the estimated set of weights $W^{l3}(t)$ to the output of the set 480 of neighbor nodes {3, 4} and node 5 in the previous layer l2 and is obtained as the estimated image descriptor. This process is also repeated to generate estimated outputs for other nodes.

The training module 320 determines the loss function 470 based on the estimated image descriptors generated at layer l3. During the update step, the training module 320 obtains terms from the loss function 470 and updates the estimated set of weights $W^{l2}(t)$, $W^{l3}(t)$ to reduce the loss function. This process is repeated until the loss function reaches a predetermined criteria, or other criteria specified by the training module 320.

The retrieval module 325 receives the query request from one or more client devices 110 and uses a graph neural network stored in the graph networks 355 datastore to identify a set of relevant images to the query and provide the query results back to the client devices 110. Specifically, responsive to receiving a query, the retrieval module 325 obtains the image descriptors for the set of images in the repository. In one instance, the image descriptors are obtained by performing a forward pass through the graph neural network using the set of trained weights for the network. In another instance, the image descriptors can already be generated during the training process, for example, as the output of nodes are generated during the last step of the training process and may be stored with the graph neural network in the graph networks datastore 355.

The retrieval module 325 generates a query node representing the query image in the graph neural network and also generates a second set of edges representing connections between the query node and at least a subset of nodes that are identified as neighbor nodes of the query image. To generate the query descriptor, the retrieval module 325 performs a forward pass using the set of participant nodes. In one embodiment, the retrieval module 325 may perform the forward pass by generating an updated query adjacency matrix $A^q$ that incorporates the query node into the adjacency matrix A by, for example, adding a row and a column to the matrix indicating adjacency scores between the query node and the subset of nodes connected to the query node. In one instance, when the set of participant nodes are limited to the first and second-order neighbors of the query node, an element $a_{ij}^q$ corresponding to an edge between node i and node j in the query adjacency matrix $A^q$ may be given by:

$$a_{ij}^q = x_q^T x_j \text{ if } i=q, \, x_j \in \mathcal{N}_k(x_q), \, x_i^T x_j \text{ if } x_i \in \mathcal{N}_k(x_q),$$
$$x_j \in \mathcal{N}_k(x_i), \, 0 \text{ otherwise.} \quad (9)$$

Thus, similarly to that described in equation (3), the output $h_i^l$ at node i for the current layer l during the inference process may be given by:

$$h_i^l = \sigma\left(W^l \sum_{j \in \mathcal{N}_k(x_i)} a_{ij}^q h_j^{(l-1)} + b^l\right) \quad (10)$$

where $a_{ij}^q$ is the corresponding adjacency scores for the node i in the query adjacency matrix $A^q$.

After the query descriptor has been generated for the query node q, the retrieval module 325 identifies a set of relevant images to the query image. In one embodiment, the set of relevant images are determined as the subset of images that have image descriptors above a similarity threshold with the query descriptor for the query image. In another instance, the retrieval module 325 obtains the query result by ranking the set of images according to similarity and selects a subset of relevant images according to the rankings, e.g., selects a subset of subset of relevant images with the highest rankings. The retrieval module 325 may provide the set of relevant images to the client device 110 as the query result.

Figure 5:
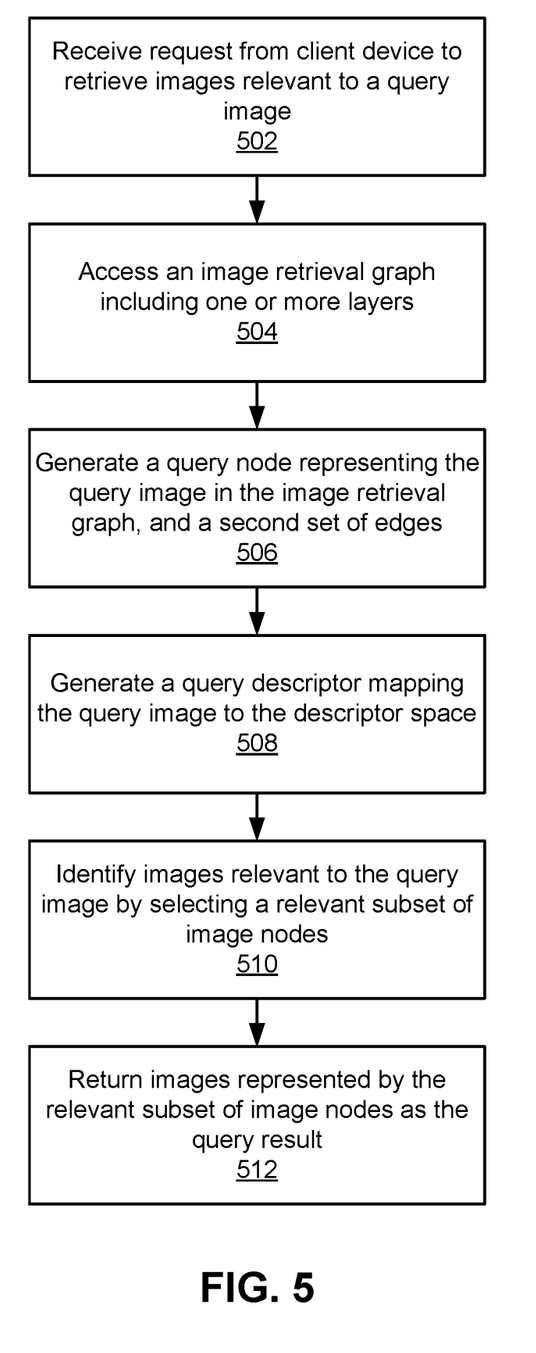
FIG. 5 illustrates a flowchart of performing an inference process for identifying relevant images to a query image using a graph neural network architecture, in accordance with an embodiment.

FIG. 5 illustrates a flowchart of performing an inference process for identifying relevant images to a query image using a graph neural network architecture, in accordance with an embodiment. The steps illustrated in FIG. 5 may be performed by the content retrieval system 130 but it is appreciated that in other embodiments, the steps can be performed by any other entity or with any other configuration as necessary.

The content retrieval system 130 receives 502 a request from a client device to retrieve images relevant to a query image. The content retrieval system 130 accesses 504 an image retrieval graph including one or more layers. The image retrieval graph includes a set of image nodes representing a set of images, and a set of edges representing connections between the set of images. The one or more layers of the graph are associated with a set of machine-learned weights. An image node is associated with an image descriptor mapping the corresponding image represented by the image node to a descriptor space.

The content retrieval system 130 generates 506 a query node representing the query image in the image retrieval graph. The content retrieval system 130 also generates a second set of edges representing connections between the query node and at least a subset of image nodes that are identified as neighbor nodes of the query image. The content retrieval system 130 generates 508 a query descriptor mapping the query image to the descriptor space by applying the set of weights to outputs of the neighbor nodes and the query node at the one or more layers of the image retrieval graph.

The content retrieval system 130 identifies 510 images relevant to the query image by selecting a relevant subset of image nodes. The image descriptors for the relevant subset of image nodes have above a similarity threshold with the query descriptor. The content retrieval system 130 returns 512 the images represented by the relevant subset of image nodes as a query result to the client device.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the disclosure is intended to be illustrative, but not limiting, of the scope of the invention, which is set forth in the following claims.

What is claimed is:

1. A computer system for automated image retrieval, the computer system comprising:
   a processor configured to execute instructions;
   a non-transient computer-readable medium comprising instructions that when executed by the processor cause the processor to:
      receive a request from a client device to retrieve images relevant to a query image;
      access an image retrieval graph including one or more layers with a set of trained weights, the image retrieval graph having a set of nodes representing a set of images and a set of edges representing connections between the set of images, wherein a node is associated with an image descriptor mapping the corresponding image represented by the node to a descriptor space;
      generate a query node representing the query image in the image retrieval graph;
      generate a second set of edges representing connections between the query node and neighbor nodes of the query node;
      generate a query descriptor mapping the query image to the descriptor space by applying the set of weights to outputs of the neighbor nodes of the query node at the one or more layers of the image retrieval graph;
      identify the images relevant to the query image by selecting a relevant subset of nodes, the image descriptors for the relevant subset of nodes having above a similarity threshold with the query descriptor; and
      return the images represented by the relevant subset of nodes as a query result to the client device.

2. The computer system of claim 1, wherein instructions to generate the query descriptor further cause the processor to:
  sequentially generate outputs for at least a second subset of nodes for the one or more layers of the image retrieval graph, wherein an output of a node in the second subset of nodes at a current layer is generated by applying a set of weights for the current layer to outputs of neighbor nodes of the node in a previous layer.

3. The computer system of claim 2, wherein the second subset of nodes are first-order and second-order neighbor nodes of the query node.

4. The computer system of claim 1, wherein the instructions further cause the processor to:
  generate base descriptors for the set of nodes and a base descriptor for the query node,
  generate adjacency scores between the query node and the set of nodes based on similarity between the base descriptor of the query node and the base descriptors of the set of nodes, and
  identify the neighbor nodes of the query node as nodes that have adjacency scores above a threshold.

5. The computer system of claim 1, wherein the query descriptor is generated by further weighting the neighbor nodes of the query node with corresponding adjacency scores for the neighbor nodes.

6. The computer system of claim 1, wherein the neighbor nodes of the query node are first-order neighbors of the query node.

7. The computer system of claim 1, wherein the query descriptor is obtained as the output of the query node at a last layer of the image retrieval graph.

8. The computer system of claim 1, wherein the set of weights in the image retrieval graph is trained by the process of:
  initializing an estimated set of weights, and
  repeatedly performing the steps of:
    generating estimated image descriptors for the set of nodes by applying the estimated set of weights to the set of nodes at the one or more layers of the image retrieval graph,
    determining a loss function as a combination of losses for the set of nodes, a loss for a node indicating a similarity between an estimated image descriptor for the node and estimated image descriptors for neighbor nodes of the node, and
    updating the estimated set of weights to reduce the loss function.

9. A method for automated image retrieval, comprising:
  receiving a request from a client device to retrieve images relevant to a query image;
  accessing an image retrieval graph including one or more layers, the image retrieval graph having a set of image nodes representing a set of images and a set of edges representing connections between the set of images, wherein the one or more layers are associated with a set of weights, and wherein an image node is associated with an image descriptor mapping the corresponding image represented by the image node to a descriptor space;
  generating a query node representing the query image in the image retrieval graph;
  generating a second set of edges representing connections between the query node and at least a subset of image nodes that are identified as neighbor nodes of the query image;
  generating a query descriptor mapping the query image to the descriptor space by applying the set of weights to outputs of the neighbor nodes and the query node at the one or more layers of the image retrieval graph;
  identifying the images relevant to the query image by selecting a second subset of image nodes, the image descriptors for the second subset of image nodes having above a similarity threshold with the query descriptor; and
  returning the images represented by the second subset of image nodes as a query result to the client device.

10. The method of claim 9, wherein generating the query descriptor further comprises:
  sequentially generating outputs for at least a second subset of nodes for the one or more layers of the image retrieval graph, wherein an output of a node in the second subset of nodes at a current layer is generated by applying a set of weights for the current layer to outputs of neighbor nodes of the node in a previous layer.

11. The method of claim 10, wherein the second subset of nodes are first-order and second-order neighbor nodes of the query node.

12. The method of claim 9, the method further comprising:
  generating base descriptors for the set of nodes and a base descriptor for the query node,
  generating adjacency scores between the query node and the set of nodes based on similarity between the base descriptor of the query node and the base descriptors of the set of nodes, and
  identifying the neighbor nodes of the query node as nodes that have adjacency scores above a threshold.

13. The method of claim 9, wherein the query descriptor is generated by further weighting the neighbor nodes of the query node with corresponding adjacency scores for the neighbor nodes.

14. The method of claim 9, wherein the neighbor nodes of the query node are first-order neighbors of the query node.

15. The method of claim 9, wherein the query descriptor is obtained as the output of the query node at a last layer of the image retrieval graph.

16. The method of claim 9, wherein the set of weights in the image retrieval graph is trained by the process of:
  initializing an estimated set of weights, and
  repeatedly performing the steps of:
    generating estimated image descriptors for the set of nodes by applying the estimated set of weights to the set of nodes at the one or more layers of the image retrieval graph,
    determining a loss function as a combination of losses for the set of nodes, a loss for a node indicating a similarity between an estimated image descriptor for the node and estimated image descriptors for neighbor nodes of the node, and
    updating the estimated set of weights to reduce the loss function.

* * * * *